United States Patent
Reiher et al.

(10) Patent No.: US 8,436,764 B2
(45) Date of Patent: May 7, 2013

(54) RADAR SENSOR AND METHOD FOR OPERATING A RADAR SENSOR

(75) Inventors: Marcus Steffen Reiher, Stuttgart (DE); Dirk Bechler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 13/165,678

(22) Filed: Jun. 21, 2011

(65) Prior Publication Data
US 2011/0309968 A1     Dec. 22, 2011

(30) Foreign Application Priority Data
Jun. 21, 2010 (DE) .......................... 10 2010 030 289

(51) Int. Cl.
*G01S 13/00* (2006.01)
(52) U.S. Cl.
USPC ................................ 342/70; 342/28; 342/109
(58) Field of Classification Search ................. 342/28, 342/70, 83, 109
See application file for complete search history.

(56) References Cited

U.S. PATENT DOCUMENTS

| | | | |
|---|---|---|---|
| 6,396,436 B1 * | 5/2002 | Lissel et al. | 342/70 |
| 6,469,656 B1 * | 10/2002 | Wagner et al. | 342/70 |
| 7,385,550 B2 * | 6/2008 | Winter et al. | 342/70 |
| 7,663,534 B2 * | 2/2010 | Hilsebecher et al. | 342/109 |
| 7,714,771 B2 * | 5/2010 | Lehre et al. | 342/109 |
| 7,786,927 B2 * | 8/2010 | Kondoh | 342/109 |
| 2006/0109169 A1 * | 5/2006 | Winter et al. | 342/70 |
| 2009/0121915 A1 * | 5/2009 | Randler et al. | 342/70 |
| 2009/0219190 A1 * | 9/2009 | Lehre et al. | 342/71 |
| 2011/0181456 A1 * | 7/2011 | Luebbert et al. | 342/70 |

FOREIGN PATENT DOCUMENTS

| | | |
|---|---|---|
| DE | 102 43 811 | 1/2004 |
| DE | 10 2009 002 243 | 10/2010 |

* cited by examiner

*Primary Examiner* — John B Sotomayor
*Assistant Examiner* — Marcus Windrich
(74) *Attorney, Agent, or Firm* — Kenyon & Kenyon LLP

(57) ABSTRACT

In operating a radar sensor, a modulation sequence having a number n of successive linear frequency ramps having different slopes $a_n$ is cyclically repeated. A received radar signal reflected from an object is mixed with the emitted radar signal to form an intermediate frequency signal, which is analyzed for each frequency ramp with respect to its frequency spectrum. Peaks occurring in the frequency spectra of the intermediate frequency signal correspond to ambiguity lines in a distance/velocity space. Possible objects are assumed at intersection points of the ambiguity lines. The expected position which the possible objects would have at the point in time of the repetition of the modulation sequence is precalculated. The slope $a_n$ of at least one of the frequency ramps is established for a subsequent modulation sequence in such a way that none of the expected positions of a possible object in the distance/velocity space is at an intersection point of precalculated ambiguity lines of the other possible objects.

14 Claims, 4 Drawing Sheets

RADAR SENSOR AND METHOD FOR OPERATING A RADAR SENSOR

CROSS-REFERENCE TO RELATED APPLICATIONS

The present application claims priority to Application No. 10 2010 030 289.9, filed in the Federal Republic of Germany on Jun. 21, 2010, which is expressly incorporated herein in its entirety by reference thereto.

FIELD OF THE INVENTION

The present invention relates to a method for operating a radar sensor

BACKGROUND AND SUMMARY

Example embodiments of the present invention relate to a method for operating a radar sensor, in which a modulation sequence having a number of successive linear frequency ramps having different slopes is cyclically repeated. A received radar signal, which is reflected from an object, is mixed with the emitted radar signal to form an intermediate frequency signal, which is analyzed for each frequency ramp with respect to its frequency spectrum. Peaks occurring in the frequency spectra of the intermediate frequency signal correspond to ambiguity lines in a distance/velocity space. Possible objects are assumed at intersection points of the ambiguity lines. Furthermore, the expected position which the possible objects would have at the point in time of the repetition of the modulation sequence is precalculated.

The present invention further relates to a radar sensor which operates according to the FMCW (frequency modulated continuous wave) principle using a modulation sequence of linear frequency ramps.

Radar sensors are used in motor vehicles, for example, to detect the surroundings of the vehicle and to locate and determine the relative velocity of preceding vehicles or oncoming vehicles. They may be used as independent distance warning systems or also as part of a driver assistance system, for example, for distance-based automatic velocity control (ACC—adaptive cruise control).

The velocity of an object may also be determined with the aid of radar sensors on the basis of the frequency shifts because of the Doppler effect between emitted radar signals and radar signals which are reflected from the object and received. In order to simultaneously obtain information about the distance of the object from the radar sensor, information about the propagation time of the radar signals is additionally necessary. In the FMCW radar method, such propagation time information may be obtained in that the frequency of the emitted radar signal is subjected to a frequency modulation using a linearly changing frequency (frequency ramp).

The received radar signal is typically mixed with a part of the emitted signal to form an intermediate frequency signal. The frequency spectrum of the intermediate frequency signal is analyzed, typically with the aid of a fast Fourier transform. An object detected by the radar system is reflected in the frequency spectrum in a peak at a frequency which is a function of the distance and the relative velocity of the object to the radar sensor.

The distance and velocity of an object cannot be unambiguously determined simultaneously from the frequency of a measured peak, however. Rather, each of the measured peaks represents a plurality of possible combinations of distance d and relative velocity $v_r$ of an object. In a distance/velocity space, referred to in short hereafter as d/v space, the plurality of the possible combinations of distance d and relative velocity $v_r$, which correspond to a frequency in the frequency spectrum of the intermediate frequency signal, is shown by a straight line whose slope is a function of the slope of the frequency ramp, i.e., the change in a frequency per unit of time. This straight line is also referred to as ambiguity line.

An unambiguous determination of distance and velocity of an object may be performed by going through a sequence of two successive frequency ramps having different slopes. The frequency of the peak in the intermediate frequency signal which is measured while going through each of the frequency ramps corresponds to an ambiguity line in the d/v space. In the case of two frequency ramps having different slopes, two ambiguity lines result, which also have different slopes and therefore intersect in a point. Distance and relative velocity of the object are unambiguously determined by this intersection point.

However, if multiple objects are located in the detection range of a radar sensor, the number of the intersection points of the ambiguity lines exceeds the number of the objects, which in turn prevents unambiguous determination of velocity and distance of each object.

One possibility for also obtaining unambiguous results in the case of multiple objects in the detection range of a radar sensor includes increasing the number of the frequency ramps having different slopes within the cyclically repeated modulation sequence. For a number n of frequency ramps having different slopes, ideally neglecting possible measurement inaccuracies, all n ambiguity lines also meet in one point, which may be viewed as a true distance/velocity combination of the object with a probability which rises with n. The probability that n ambiguity lines meet in one point which does not correspond to a real object (accidental or incorrect intersection point) decreases with number n of frequency ramps. However, the number n may not be selected as arbitrarily high, since, on the one hand, the computing effort rises with the number of the frequency ramps and, on the other hand, the duration of a modulation sequence lengthens in such a way that the radar sensor no longer achieves sufficient time resolution. In practice, three or at most four frequency ramps are therefore typically used in a modulation sequence. In such a case, however, accidental intersection points may also occur, in particular if the number of objects in the detection range of a radar sensor and therefore the density of the peaks in the spectra of the intermediate frequency signal is high.

A method for operating a radar sensor is known from German Patent Application Publication DE 102 43 811 A1, in which to reduce incorrect recognition of objects, the results of successive modulation sequences are compared and an object is not viewed as a real object while the object is repeatedly identified at positions matching one another in the distance/velocity space. For this purpose, the position to be expected of a possible object recognized in a first modulation sequence is predetermined for a subsequent modulation sequence on the basis of the established velocity and the established distance in the d/v space. However, this method also does not preclude that an accidental intersection point of ambiguity lines in the second modulation sequence will be precisely at the precalculated location of a possible object identified in the first modulation sequence, which would therefore result in an identification of the possible object as a real object.

It is therefore an object of the present invention to provide a method for operating an FMCW radar sensor, which has the lowest possible incorrect recognition rate and good time resolution. It is a further object to provide a radar sensor capable of performing the method.

This object is achieved according to the present invention by a method for operating a radar sensor of the type described at the beginning, and a radar sensor in which the slope of at least one of the frequency ramps is established for a subsequent sequence in such a way that none of the expected positions of a possible object in the distance/velocity diagram is at an intersection point of precalculated ambiguity lines of the other possible objects.

In this way, an accidental intersection point of ambiguity lines in the distance/velocity diagram is also prevented from being identified as a real object in the case of a smaller number of frequency ramps per modulation sequence. In contrast to methods in which the number of the frequency ramps of the modulation sequence is increased, the probability of the occurrence of accidental intersection points is not reduced. Rather, accidental intersection points are prevented from occurring at the expected positions of possible objects. As a result, the accidental intersection points in the distance/velocity space change their position in an uncoordinated way from modulation sequence to modulation sequence, while in contrast intersection points which correspond to real objects continuously occupy a position matching the predetermined object behavior. Accidental intersection points may be reliably recognized in this way.

It should be understood that the features mentioned above and those yet to be explained below may be used not only in the particular combination given but also in other combinations or alone.

Example embodiments of the present invention are illustrated schematically in the Figures and are described below in more detail with reference to the Figures.

DETAILED DESCRIPTION

Figure 1:
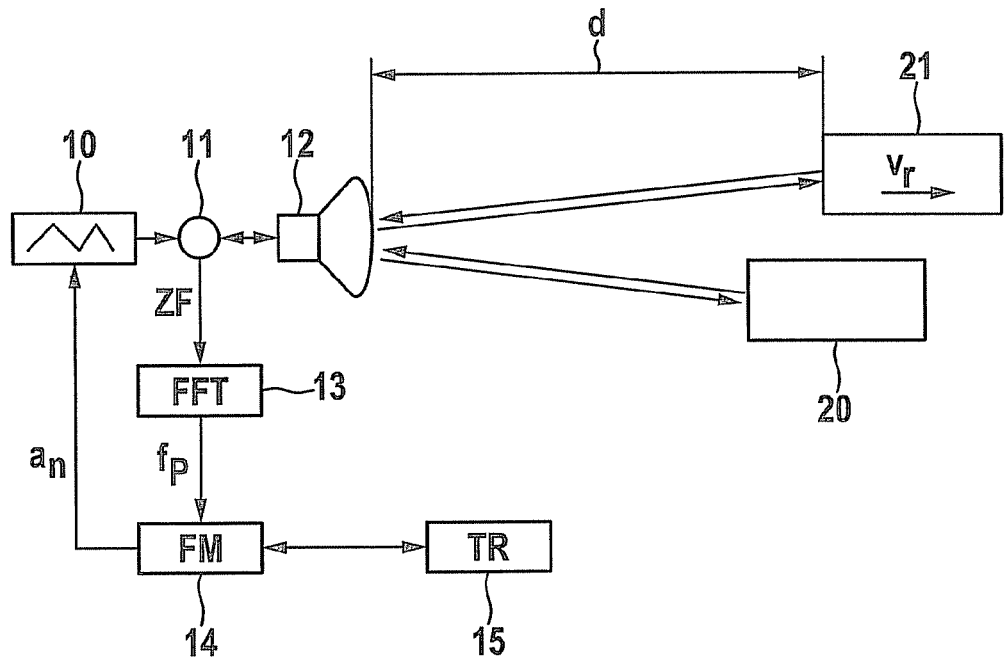
FIG. 1 shows a block diagram of an FMCW radar sensor.

FIG. 1 shows an FMCW radar sensor, for example, for use in a driver assistance system of a motor vehicle.

The radar sensor has a signal generator 10, which generates a radar signal having ramped modulated frequency, which is relayed via a mixer 11 to a transceiver unit 12. A modulation sequence successively goes through a number n of frequency ramps, which rise or fall linearly with respect to time and have different slopes $a_n$.

Transceiver unit 12 has antennas for emitting the radar signal and for receiving reflected radar signals. Two reflecting objects 20 and 21 are drawn in the recognition field of the radar sensor as examples in FIG. 1. Each of objects 20 and 21 is characterized by a distance d from the radar sensor and a velocity $v_r$ relative to the radar sensor. In the case of angle-resolving radar sensors, objects 20, 21 are additionally characterized by an angle at which they appear to the radar sensor.

The radar beam reflected from objects 20, 21 is in turn received by transceiver unit 12 and relayed to mixer 11, where it is mixed with the radar signal produced at this point in time by signal generator 10. The mixed signal, also referred to as intermediate frequency signal ZF, is supplied to a spectral analysis emit 13, in which a fast Fourier transform (FFT) is performed. Each object 20, 21 in the recognition field of the radar sensor causes a peak to occur at a peak frequency $f_P$ in the spectrum of intermediate frequency signal ZF, peak frequency $f_P$ being a function of distance d, velocity $v_r$, and the slope of the current frequency ramp.

Ascertained peak frequencies $f_P$ are relayed to an analysis module 14, also referred to as frequency matching module 14. Frequency matching module 14 ascertains distance d and velocity $v_r$ of possible objects in the recognition field of the radar sensor from peak frequencies $f_P$ measured for each of the frequency ramps of a modulation sequence. This is explained in greater detail in connection with the further figures.

Ascertained distances d and relative Velocities $v_r$ of the located possible objects are supplied to a tracking module 15. The tracking module tracks located and possible objects and projects their positions and velocities into the future. In this way, tracking module 15 may predict distance d and velocity $v_r$ of possible objects for the point in time of passage through a subsequent modulation sequence. The predicted distance and velocity information is returned to frequency matching module 14. Frequency matching module 14 determines, using an analysis described in greater detail hereafter employing the information provided by tracking module 15, parameters for a subsequent modulation sequence to be passed through and relays these parameters to signal generator 10. In particular, these parameters relate to slopes $a_n$ of the n frequency ramps of the modulation sequence.

Figure 2:
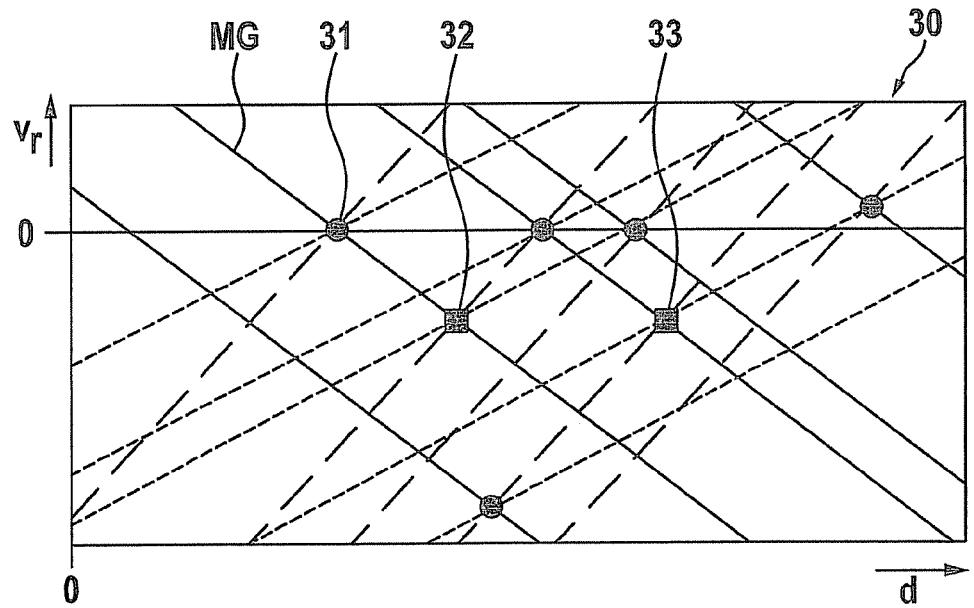
FIG. 2 shows a diagram of a d/v space having ambiguity lines of a first modulation sequence having three frequency ramps and seven identified possible objects.

FIG. 2 shows a representation of a distance/velocity space 30 in a two-dimensional diagram, distance d being plotted on the abscissa and relative velocity $v_r$ being plotted on the ordinate. An object which is characterized by its distance d to the radar sensor and its velocity $v_r$ relative to the radar sensor thus corresponds to precisely one point in the diagram of div space 30. Objects moving away from the radar sensor have a positive relative velocity $v_r$ and are accordingly plotted above the drawn-in velocity zero line. Objects moving toward the radar sensor have a negative relative velocity and are accordingly located in the bottom part of the diagram below the zero line.

Five actual objects are shown as round points 31 as an example in the diagram of FIG. 2. For reasons of clarity, only one of these points is provided with a reference numeral. Three of the objects are located at different distances d on the velocity zero line, for example; these are further vehicles traveling at the same velocity ahead of the vehicle, which is equipped with the radar sensor. A fourth point 31 is slightly above the zero line, for example; this is a further vehicle which is traveling at greater absolute velocity in front of the vehicle in question and is slowly moving away. A fifth point 31 is in the bottom part of the diagram. The associated object may be a vehicle approaching on the opposite roadway, a slower preceding vehicle, or a stationary object.

In a situation as shown in FIG. 2, in the case of a radar sensor of FIG. 1, the five real objects would result in five peaks in the spectrum of intermediate frequency signal ZF, it being assumed for simplification that the peaks are separated from one another and do not overlap. The spectra of intermediate frequency signals ZF and therefore ascertained five peak frequencies $f_P$ are a function of the slope of the frequency ramp currently being gone through. Under the assumption that a modulation sequence includes three successive frequency ramps having different slopes, the object situation is reflected in FIG. 2 in 3 times 5 peak frequencies $f_P$.

The following equation applies for peak frequency $f_P$ assigned to the reflections of an individual object in the spectrum of intermediate frequency ZF:

$$f_P = \alpha \times d + \beta \times v_r,$$

$\alpha$ being a constant which is a function of the slope of the modulation ramp and $\beta$ being a constant which is proportional to the mean frequency of the radar signal and describes the velocity dependence of frequency $f_P$ because of the Doppler effect. After rearrangement, one obtains:

$$v_r = -(\alpha/\beta) \times d + (f_P/\beta)$$

This is the equation of a straight line in the distance/velocity space. This line specifies all possible combinations of distance d and velocity $v_r$, which an object which has caused the peak at frequency $f_P$ in the intermediate frequency spectrum may have. Such a straight line is referred to as ambiguity line.

To evaluate measured peak frequencies $f_P$ in intermediate frequency signal ZF, the corresponding ambiguity line is calculated for each peak frequency $f_P$. The slope of the ambiguity lines is a function, in addition to fixed constant $\beta$, of the slope of the frequency ramps. Therefore, a family of parallel ambiguity lines in the d/v space results for each frequency ramp. For a first modulation sequence having three frequency ramps of different slopes, three sets of five ambiguity lines MG, which are each parallel to one another, thus arise. These ambiguity lines MG are shown by solid, short-dashed, or long-dashed lines in FIG. 2.

An intersection point of multiple ambiguity lines MG having different slopes at a distance d and a velocity $v_r$ indicates a possible object having this distance and velocity. It may be provided that, if n frequency ramps are present in a modulation sequence, n ambiguity lines MG must also intersect to identify a possible object. Alternatively, it is conceivable that an intersection point of a number of m ambiguity lines, where m<n, is considered to already be sufficient to identify a possible object. For the following illustration, it is assumed as an example thereof that in the case of three frequency ramps, three ambiguity lines must also intersect to identify a possible object.

However, since the frequencies of the peaks may generally only be determined with limited precision, it is not to be expected that the three ambiguity lines will intersect mathematically precisely in one point. Rather, three different intersection points are probable, in each of which two of the straight lines intersect and which are relatively close to one another. In order that possible objects may be identified at all, a certain tolerance is permitted. For example, a radius in the diagram of d/v space 30 may be specified, within which the three ambiguity lines must intersect in order to identify a possible object. In the example shown, such a radius is assumed in the range of the line thicknesses of ambiguity lines MG.

As expected, three ambiguity lines MG having different slopes intersect in each case in FIG. 2 in points 31 in d/v space 30 which are assigned to the real objects. In addition, however, two further intersection points are formed in each case by three ambiguity lines MG having different slopes, namely at points 32 and 33, which are shown by rectangular symbols. Without the information about the number and the position and velocity of the real objects provided for explanation when describing FIG. 2, points 32 and 33 may initially be differentiated from point 31 in the analysis of intermediate frequency signals ZF. As a result, an analysis of one first modulation sequence passed through results in ascertaining seven possible objects in the recognition field of the radar sensor.

After ascertaining the parameters distance d and relative velocity $v_r$, of all possible objects by frequency matching module 14, this information is relayed to tracking module 15. Tracking module 15 projects these values to the point in time of the performance of a next modulation sequence. The corresponding precalculated distance and velocity values are transmitted back to frequency matching module 14.

Figure 3:
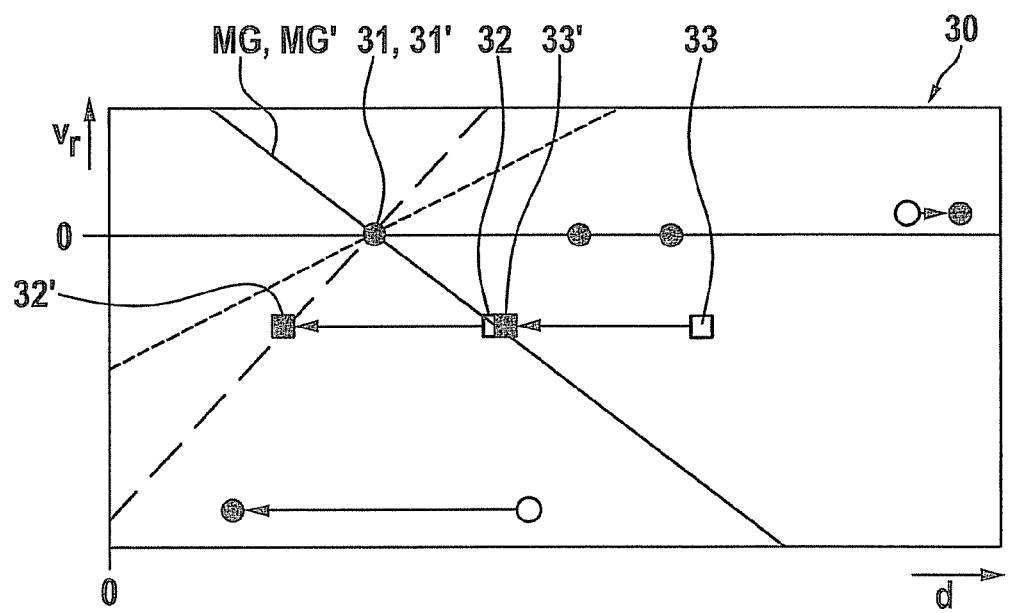
FIG. 3 shows a diagram similar to FIG. 2 having precalculated positions of the seven identified possible objects.

For the situation shown in FIG. 2, the resulting precalculated object situation projected on the d/v space is shown in FIG. 3. Points 31, 32, and 33, which are the basis of the precalculation and are known from FIG. 2, are plotted once again here as open symbols. The precalculated positions are shown using filled-in symbols as points 31', 32', and 33'. Not all points are provided with reference numerals again for reasons of clarity. Possible objects having a relative velocity of 0 are shown by themselves, the object above the zero line having the positive relative velocity being shifted to the right in the diagram, the objects drawn in the bottom area of the diagram having a negative relative being shifted to the left in the diagram.

Figure 4:
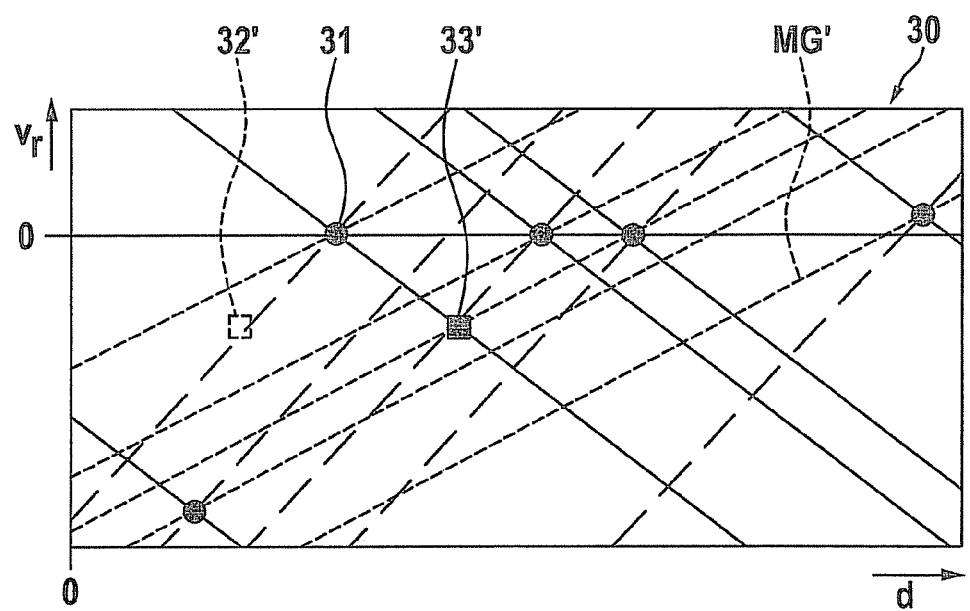
FIG. 4 shows a diagram similar to FIG. 3 having ambiguity lines drawn in for the first modulation sequence.

FIG. 4 shows a d/v diagram for a situation similar to that of FIG. 2, which would result if the first modulation sequence on which FIG. 2 is based were repeated as a next modulation sequence. Corresponding ambiguity lines MG are again drawn in the diagram of d/v space 30 for all measured peak frequencies $f_P$. As to be expected for real objects under the assumption of correct tracking, three ambiguity lines MG having different slopes again intersect in each case at the predetermined positions, which are assigned to the real objects, of points 31'. An object recognition method which classifies a possible object as a real recognized object when it is recognized consistently in a specified number of successively executed modulation sequences as a possible object at the predetermined position, for example, in two successive modulation sequences, would classify the possible objects corresponding to points 31' as real objects. Furthermore, it is apparent that in the first modulation sequence, the possible object assigned to point 32 does not prove to be a real object, since no intersection of ambiguity lines MG may be observed at the corresponding position of point 32' in the second modulation sequence. The situation is different in the case of the possible object which was assigned to point 33. An intersection of three ambiguity lines MG having different slopes is accidentally at the precalculated position of this possible object, i.e., at the position of point 33'. Because of this accidental intersection point, known methods would assume a real object at the position of point 33', also taking into account successive modulation sequences.

According to the present invention, if such a situation exists, in which an intersection point of a predetermined number of precalculated ambiguity lines MG', which are assigned to further possible objects at their precalculated positions in the d/v space, is to be expected at the precalculated position of a possible object in d/v space, at least the slope of one of the frequency ramps is changed in such a way that such a coincidence of precalculated positions of an object and intersection points of ambiguity lines MG' of the other objects does not occur.

Figure 5:
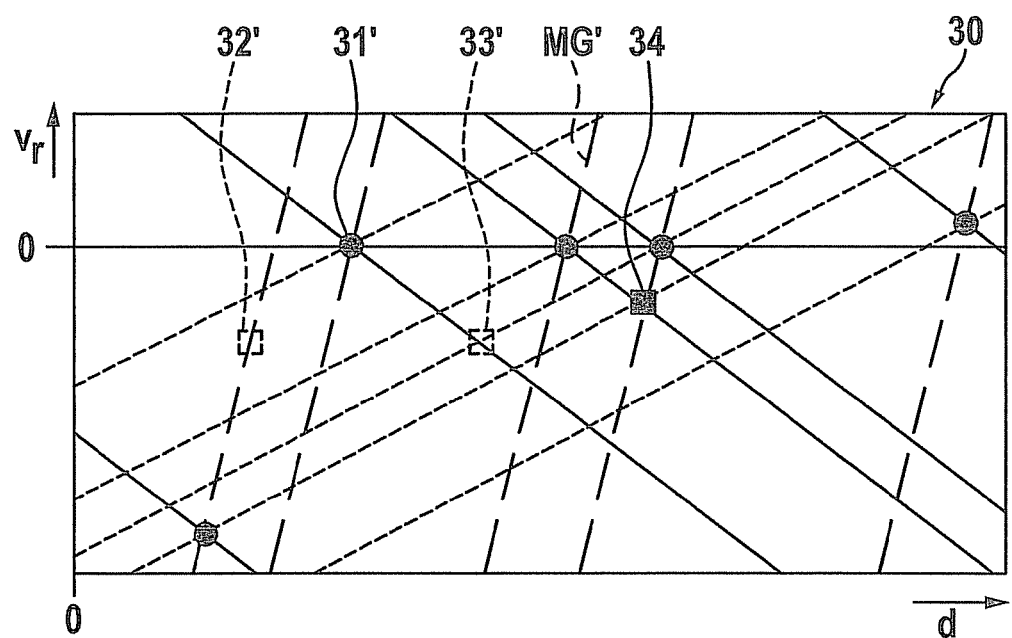
FIG. 5 shows a diagram similar to FIG. 3 having ambiguity lines drawn in for a second modulation sequence, which is changed in relation to the first.

The resulting situation is shown in FIG. 5. In relation to FIGS. 2 and 4, in one of the frequency ramps the slope was changed, which results in a different slope of the parallel ambiguity lines shown by the long-dashed lines. As a result of this alteration, three ambiguity lines do not meet one another at the expected positions of the possible objects assigned to points 32 and 33, i.e., at the positions of points 32' and 33', in either of the two cases. Correspondingly, in this pass, no possible objects would be suspected at these positions, whereby the recognition method rules out these possible objects as real objects.

It is unavoidable that an intersection point of three ambiguity lines will occur at a location in d/v space other than point 34 shown in FIG. 5. A possible object would thus be ascertained at this point as a result of going through the second modulation sequence. Since an accidental repeated occurrence of such an intersection point at the precalculated position of the possible object assigned to point 34 would in turn be prevented in a similar way when going through a third modulation sequence, however, this possible object would already be ruled out as a real object in the next sequence.

As already noted, it is conceivable that an intersection point of a number of m<n ambiguity lines is already considered to be sufficient to identify a possible object (m-fold intersection point). If an intersection point again occurs in such a case at an expected position of a possible object, as above in the case of an n-fold intersection point, the slope of at least one modulation ramp is changed. However, only those modulation ramps come into consideration for a change which are assigned to one of the m intersecting ambiguity lines, i.e., which participate in the occurrence of an intersection point.

Figure 6:
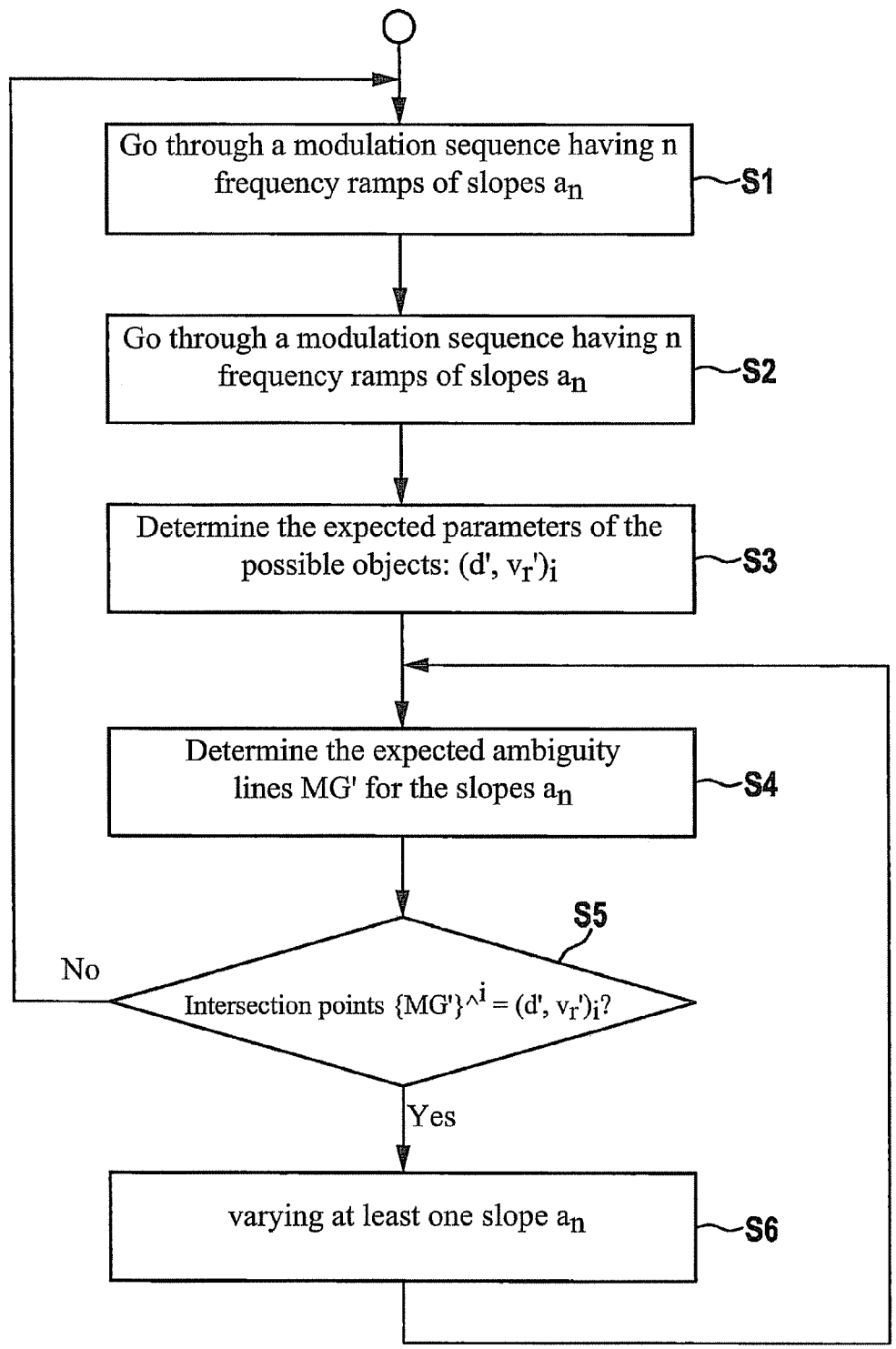
FIG. 6 shows a flow chart of an exemplary embodiment of a method for operating a radar sensor.

FIG. 6 shows, in a flow chart, an exemplary embodiment of the method according to the present invention, as may be performed, for example, by the radar sensor shown in FIG. 1 and as was already described summarily in connection with FIGS. 2 through 5.

In a first step S1, the radar sensor goes through a modulation sequence having a number n of linear frequency ramps. The n frequency ramps have different slopes $a_n$ from one another.

In a second step S2, intermediate frequency signals ZF measured during each frequency ramp are analyzed, in that their frequency spectrum is determined and peak frequencies $f_P$ of existing peaks are ascertained. Corresponding ambiguity lines MG are calculated for the peak frequencies in a distance/velocity space and this d/v space is examined for intersection points of ambiguity lines MG. A number m of ambiguity lines MG is specified, which must meet to identify a possible object using an intersection point. The number m may be less than or equal to n. Furthermore, a tolerance range may be specified in the d/v space, within which adjacent intersection points are combined. On the basis of the intersection points which fulfill the criteria, a number I of possible objects is identified, which are characterized by the parameters distance d and velocity $v_r$ in the d/v space, i.e., the value pair (d, $v_r$). The value pair (d, $v_r$) may thus also be viewed as the position in the d/v space.

In a subsequent step S3, parameters d' and $v_r$' to be expected of the I possible objects are predetermined at the point in time of going through a next modulation sequence.

In a subsequent step S4, n ambiguity lines MG' are precalculated for each of the possible I objects, values $a_n$ being used as the slopes of the frequency ramps.

In subsequent step S5, it is successively ascertained for each possible object whether its position (d', $v_r$') in the d/v space, which was predetermined in step S3, is coincident with an intersection point of m ambiguity lines MG', this being based on the set of ambiguity lines MG' of all other (i−1) possible objects. If this is answered with "yes" for at least one object, the method is continued in a step S6.

In this step S6, at least one of values $a_n$ for the slopes is changed, n slopes $a_n$ still differing from one another. The method is continued again at step S4, so that steps S4, S5, and optionally S6 are repeated until the criterion in step S5 is answered with "no." The method branches to step S1 again using the set of slopes $a_n$ which is found, whereby the method goes through a next modulation sequence until the criterion is not fulfilled in step S5, whereby a subsequent accidental confirmation of an incorrectly recognized object is prevented.

In the example shown in FIG. 5, the slope of only one of the frequency ramps was changed. However, it is also possible to change multiple frequencies simultaneously. The ratio of the slope of the frequency ramps to one another has effects on the detection sensitivity for established object configurations, driving velocities, and distances. A variation of only one of the frequencies could thus be accompanied by a change of this detection characteristic. In an advantageous design, multiple differing sets of frequency ramp slopes may be specified in a library for given driving situations, and a change of the slopes of modulation ramps may be performed by selecting a different slope, which is also adapted to the driving situation, however.

What is claimed is:

1. A method for operating a radar sensor, comprising:
    emitting a continuous radar signal having varying frequency, the frequency changing according to a cyclically repeated modulation sequence of a number n of successive linear frequency ramps having different slopes $a_n$,
    mixing a received radar signal reflected from an object with the emitted radar signal to form an intermediate frequency signal (ZF),
    analyzing the intermediate frequency signal (ZF) with respect to its frequency spectrum while going through each of the n frequency ramps, peaks occurring in the frequency spectra of the intermediate frequency signal (ZF) each corresponding to one ambiguity line (MG) in a distance/velocity space (30), the slope of each ambiguity line (MG) being a function of the slope $a_n$ of the respective frequency ramp,
    determining positions (d, $v_r$) of possible objects at intersection points of the ambiguity lines (MG), and
    precalculating the expected position (d', $v_r$') the possible objects will have at the point in time of a repetition of the modulation sequence,
    wherein the slope $a_n$ of at least one of the frequency ramps is established for a subsequent modulation sequence in such a way that none of the expected positions (d', $v_r$') of a possible object in the distance/velocity space is at an intersection point of precalculated ambiguity lines (MG') of the other possible objects.

2. The method according to claim 1, wherein, after the execution of a first modulation sequence having the number of n successive linear frequency ramps having different slopes $a_n$ to establish the slopes $a_n$ of the frequency ramps of a second modulation sequence, the following steps are performed:
    precalculating the ambiguity lines (MG') to be expected for each possible object at its position (d', $v_r$') to be expected while going through the second modulation sequence, current slopes $a_n$ of the frequency ramps being assumed;
    determining for each possible object whether intersection points of the precalculated ambiguity lines (MG') of other possible objects in the distance/velocity space (30) exist at the predetermined position (d', $v_r$') of the possible object;
    if intersection points are determined to exist at the predetermined position (d', $v_r$') of the possible object, changing the current slope $a_n$ of at least one frequency ramp and repeating the preceding steps;

if intersection points are determined to not exist, executing the second modulation sequence of the n successive linear frequency ramps using the current slopes $a_n$.

3. The method according to claim 2, further comprising:
adopting the slopes $a_n$ of the frequency ramps of the first modulation sequence as the current slopes $a_n$ during a first run.

4. The method according to claim 1, further comprising:
adopting a set of slopes $a_n$ for the n frequency ramps from a quantity of predefined sets to change the slopes $a_n$.

5. The method according to claim 4, wherein the set of slopes $a_n$ is selected from the predefined sets as a function of the number and distribution of the positions (d', $v_r$') of the possible objects in the d/v space.

6. The method according to claim 4,
wherein the radar sensor is a radar sensor of a vehicle and the set of slopes $a_n$ is selected from the predefined sets as a function of driving parameters of the vehicle.

7. The method according to claim 1,
wherein only those intersection points are observed at which a number of m ambiguity lines (MG, MG') intersect, m being predefined and being less than or equal to n, and the slope $a_n$ of such a frequency ramp which is assigned to one of the m intersecting ambiguity lines (MG, MG') being changed.

8. The method according to claim 1, wherein the number n of the successive linear frequency ramps in a modulation sequence is at least two.

9. The method according to claim 1, wherein the number n of the successive linear frequency ramps in a modulation sequence is at least three.

10. The method according to claim 1, wherein the number n of the successive linear frequency ramps in a modulation sequence is at least four.

11. The method according to claim 1, further comprising:
classifying a possible object identified in the analysis of a first modulation sequence at the position (d, $v_r$) as a real object in response to the possible object being again detected at the predetermined position (d', $v_r$') in the analysis of at least one subsequent modulation sequence.

12. A device, comprising:
a radar sensor configured to (a) operate according to the FMCW method using a modulation sequence having linear frequency ramps, and (b) perform the method according to claim 1.

13. The device according to claim 12, wherein the radar sensor is part of a vehicle.

14. A vehicle, comprising:
a radar sensor configured to (a) operate according to the FMCW method using a modulation sequence having linear frequency ramps, and (b) perform the method according to claim 1.

* * * * *